US012574492B2

(12) United States Patent
Bae et al.

(10) Patent No.: US 12,574,492 B2
(45) Date of Patent: Mar. 10, 2026

(54) IMAGE PROCESSING METHOD USING TRANSPARENT FLAT PLATE, AND APPARATUS FOR PERFORMING SAME

(71) Applicant: KOREA ADVANCED INSTITUTE OF SCIENCE AND TECHNOLOGY, Daejeon (KR)

(72) Inventors: Seok Hyung Bae, Daejeon (KR); Joon Hyub Lee, Daejeon (KR); Sang Gyun An, Daejeon (KR); Yong Kwan Kim, Daejeon (KR); Hyung Gi Ham, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 952 days.

(21) Appl. No.: 17/780,905

(22) PCT Filed: Nov. 19, 2020

(86) PCT No.: PCT/KR2020/016338
§ 371 (c)(1),
(2) Date: Dec. 14, 2022

(87) PCT Pub. No.: WO2021/107499
PCT Pub. Date: Jun. 3, 2021

(65) Prior Publication Data
US 2023/0127260 A1 Apr. 27, 2023

(30) Foreign Application Priority Data
Nov. 29, 2019 (KR) ........................ 10-2019-0157199

(51) Int. Cl.
*H04N 13/363* (2018.01)
*H04N 13/139* (2018.01)
*H04N 13/183* (2018.01)

(52) U.S. Cl.
CPC ......... *H04N 13/363* (2018.05); *H04N 13/139* (2018.05); *H04N 13/183* (2018.05)

(58) Field of Classification Search
CPC ... H04N 13/363; H04N 13/139; H04N 13/183
(Continued)

(56) References Cited

U.S. PATENT DOCUMENTS

2009/0017424 A1* 1/2009 Yoeli ...................... G02B 27/01
434/44
2012/0243743 A1 9/2012 Pastor et al.
(Continued)

FOREIGN PATENT DOCUMENTS

KR 10-2012-0133648 A 12/2012
KR 101455745 B1 11/2014
(Continued)

OTHER PUBLICATIONS

Korean Intellectual Property Office, English Translation of International Search Report issued Apr. 9, 2021, for PCT Application No. PCT/KR2020/016338, 2 pages.

*Primary Examiner* — Magda Cruz
(74) *Attorney, Agent, or Firm* — Dorsey & Whitney LLP

(57) ABSTRACT

Disclosed are an image processing method and an apparatus for performing the same. An image processing method according to one embodiment comprises the steps of: acquiring information about sensing a user; and displaying a back-projection image obtained by back-projecting at least one object that is visible through a transparent flat plate onto the transparent flat plate on the basis of the information.

20 Claims, 11 Drawing Sheets

(58) Field of Classification Search
USPC ............................................................ 353/7
See application file for complete search history.

(56) References Cited

U.S. PATENT DOCUMENTS

| | | | | |
|---|---|---|---|---|
| 2013/0257848 A1* | 10/2013 | Westerinen | ........ | G02B 27/0101 |
| | | | | 345/419 |
| 2016/0054793 A1* | 2/2016 | Kasahara | .............. | G06F 3/0412 |
| | | | | 345/633 |
| 2020/0242844 A1* | 7/2020 | Bae | ........................... | G06T 3/40 |

FOREIGN PATENT DOCUMENTS

| | | | |
|---|---|---|---|
| KR | 10-2014-0142337 A | 12/2014 |
| KR | 10-2015-0064761 A | 6/2015 |
| KR | 10-2016-0016964 A | 2/2016 |
| KR | 10-2017-0031733 A | 3/2017 |

* cited by examiner

IMAGE PROCESSING METHOD USING TRANSPARENT FLAT PLATE, AND APPARATUS FOR PERFORMING SAME

TECHNICAL FIELD

The following description relates to a technology for processing an image using a transparent flat plate.

BACKGROUND ART

We envision a future where wearable devices obtain information from the Internet and local nodes. For example, a user may wear smart glasses on their eyes and imagine a rich computing future that brings information from the Internet of things (IoT) into the space around the user as interactive virtual elements.

Whenever a particular computing form factor becomes common, such as when desktop computers appeared in the 1980s, or smart phones appeared in the 2000s, a user interface (UI) that facilitates these computing form factors has been developed.

When a developer designs a new UI, the developer may design by optionally borrowing concepts from previous paradigms such as windows that work adaptively for their intended purpose, icons, menus, the pointer (WIMP) and touch user interface (TUI).

A small head mounted display (HMD) device worn on the user's eyes will be able to provide the user with augmented reality (AR) more realistically by placing a virtual object in a physical space. This virtual object may be used for IoT, robot engineering, three-dimensional (3D) sketching and the like, since the virtual object can be simple annotations that allow the user to gain more information about physical spaces and the object, or quickly view more complex spatial UI elements that the user need to interact for rich space work.

The virtual object may appear in various environments within the immersive AR situation, and the user may easily control nearby virtual object through gestures. However, the method of interacting with a remote virtual object is relatively difficult and requires complex technology. A method such as ray casting is inevitably less direct than a method of simply touching by hand, and inevitably lowers intuition.

DISCLOSURE OF THE INVENTION

Technical Goals

An aspect provides an image processing technology capable of displaying an object on a transparent flat plate. Another aspect provides a technique for performing an interaction with an object using the image processing technology.

Technical Solutions

According to an aspect, there is provided an image processing method including obtaining information on sensing a user and displaying an image obtained by back-projecting at least one object viewed through a transparent flat plate onto the transparent flat plate based on the information on the transparent flat plate.

The displaying may include displaying the image including a stereoscopic image of the at least one object.

The displaying may include displaying the image including a monoscopic image of the at least one object.

The image may be an image obtained by back-projecting while maintaining an apparent size of the at least one object.

The information on sensing may include a distance between the user's hand and the transparent flat plate.

The displaying may include displaying the image for gradually flattening the at least one object as the distance decreases.

The displaying may include displaying the image for gradually unflattening the at least one object as the distance increases.

The displaying may include displaying the image including the monoscopic image of the at least one object on the transparent flat plate when the distance is less than or equal to a threshold.

The image processing method may further include controlling at least one of the at least one object and a vicinity of the at least one object using the image.

According to another aspect, there is provided an image processing apparatus including a memory including instructions and a processor configured to execute the instructions, wherein, when the instructions are executed by the processor, the processor is configured to display an image obtained by back-projecting at least one object viewed through a transparent flat plate onto the transparent flat plate based on information on sensing a user on the transparent flat plate.

The processor may be configured to display the image including a stereoscopic image of the at least one object.

The processor may be configured to display the image including a monoscopic image of the at least one object.

The image may be an image obtained by back-projecting while maintaining an apparent size of the at least one object.

The sensed information may include a distance between the user's hand and the transparent flat plate.

The processor may be configured to display the image for gradually flattening the at least one object as the distance decreases.

The processor may be configured to display the image for gradually unflattening the at least one object as the distance increases.

The processor may be configured to display the image including the monoscopic image of the at least one object on the transparent flat plate when the distance is less than or equal to the threshold.

The processor may be configured to control at least one of the at least one object and the vicinity of the at least one object by using the image.

A sensor for sensing the information of the user may be located in at least one of the transparent flat plate and the image processing apparatus.

BEST MODE FOR CARRYING OUT THE INVENTION

Figure 1:
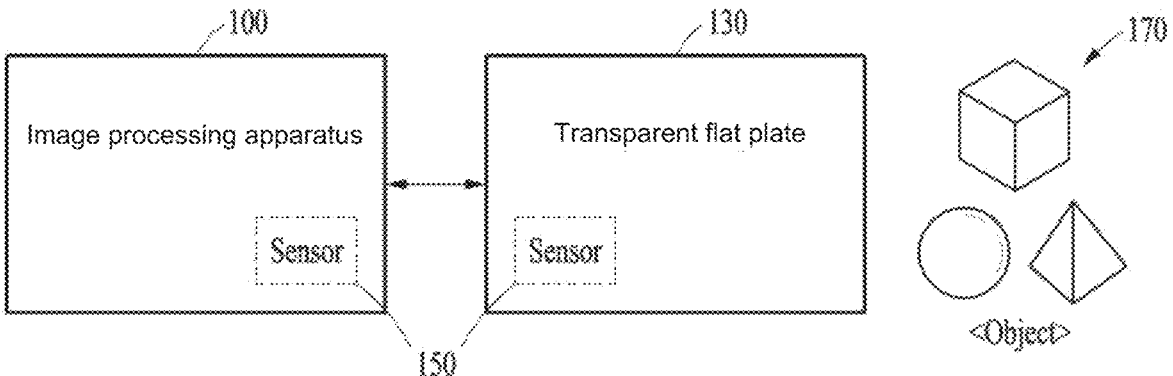
FIG. 1 is a schematic diagram illustrating an image processing system for processing an image using a transparent flat plate according to an example embodiment.

Hereinafter, example embodiments will be described in detail with reference to the accompanying drawings. However, since various modifications may be made to the example embodiments, the scope of the patent application is not limited or restricted by these example embodiments. It should be understood that all changes, equivalents and replacements for the example embodiments are included in the scope of the application.

The terminology used in the example embodiments is for the purpose of description only, and should not be construed as limiting. The singular expression includes the plural expression unless the context clearly indicates otherwise. In the present specification, it will be understood that the terms "comprises" and/or "comprising," specify the presence of features, integers, steps, operations, elements, components or a combination thereof which are stated in the specification, but do not preclude the presence or addition of one or more other features, integers, steps, operations, elements, components, and/or groups thereof.

Although terms of "first," "second," and the like are used to explain various components, the components are not limited to such terms. Terms are used only to distinguish one component from another component. For example, a first component may be referred to as a second component, or similarly, the second component may be referred to as the first component within the scope according to the concept of an example embodiment.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined in the present application.

In addition, when describing with reference to the accompanying drawings, the same components are denoted by the same reference numerals regardless of reference numerals and a repeated description related thereto will be omitted. In describing example embodiment, when it is determined that a specific description of a related known technology may unnecessarily obscure the gist of the example embodiments, a detailed description thereof will be omitted.

Hereinafter, example embodiments will be described in detail with reference to the accompanying drawings. However, the scope of the patent application is not limited or restricted by these example embodiments.

Figure 2:
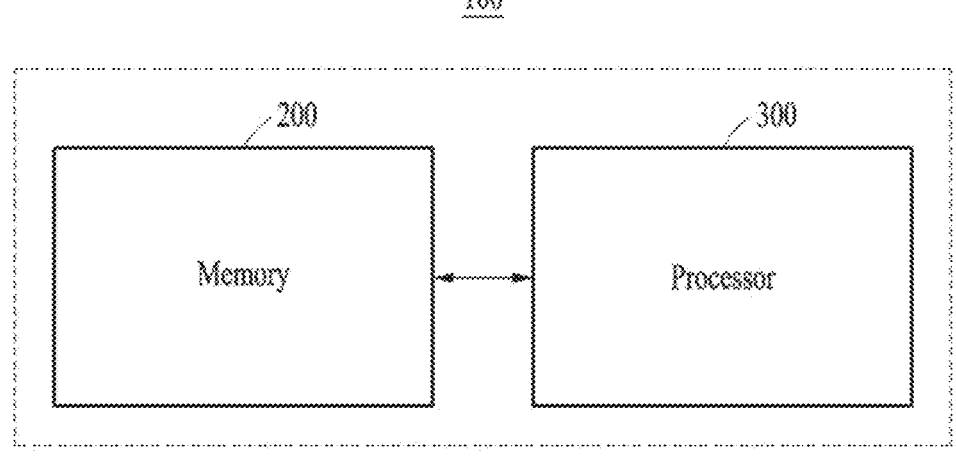
FIG. 2 is a schematic block diagram illustrating an image processing apparatus illustrated in FIG. 1.

FIG. 1 is a schematic diagram illustrating an image processing system for processing an image using a transparent flat plate according to an example embodiment, and FIG. 2 is a schematic block diagram illustrating an image processing apparatus shown in FIG. 1.

Referring to FIG. 1 and FIG. 2, an image processing system 10 includes an image processing apparatus 100, a transparent flat plate 130, and a sensor 150. The image processing apparatus 100 may implement a world using virtual and/or reality. For example, the image processing apparatus 100 may implement AR, virtual reality (VR), mixed reality (MR), or extended reality (XR). A user may experience the AR, the VR, the MR, or the XR implemented through the image processing apparatus 100.

The image processing apparatus 100 may be implemented as a portable electronic device. For example, the image processing apparatus 100 may be implemented as a smart device. The smart device may include a head mounted display (HMD), smart glasses, a smart watch, and a smart band. In other words, the image processing apparatus 100 may be a wearable device that the user can wear or is suitable for wearing.

The image processing apparatus 100 may process at least one object 170 in the AR, the VR, the MR, or the XR using the transparent flat plate 130 and the sensor 150.

The object 170 may be located away from the transparent flat plate 130. For example, the object 170 may include one or more objects that a user views through transparent flat plate 130. The object 170 may include one or more objects that may be viewed by the user through the transparent flat plate 130 even if the user does not view the object 170 through the transparent flat plate 130. The object 170 may be a real object, a virtual object, or a virtual image.

The user may view the at least one object 170 in a flat or three-dimensional manner through the transparent flat plate 130 by the image processing apparatus 100. Also, the user may interact with at least one of the at least one object 170 and the vicinity of the object 170 using the transparent flat plate 130. The vicinity of the object 170 may mean a vicinity area surrounding the object 170 viewed through the transparent flat plate 130. The size of the vicinity area may vary depending on the transparent flat plate 130.

The image processing apparatus 100 includes a memory 200 and a processor 300. The processor 300 may control the overall operation of the image processing apparatus 100. In the AR, the VR, the MR, or the XR, the processor 300 may process an image of at least one object 170 viewed through the transparent flat plate 130. The user may use the image processed by the image processing apparatus 100 to interact with the object 170 and the vicinity of the object 170 in the AR, the VR, the MR, or the XR.

The processor 300 may display a back-projection image obtained by back-projecting at least one object 170 viewed through the transparent flat plate 130 onto the transparent flat plate 130 based on information obtained by the sensor 150 sensing the user on the transparent flat plate 130. The back-projection image may be an image obtained by back-projecting only the object 170 or an image obtained by back-projecting the object 170 and the vicinity of the object 170 together. For example, the back-projection image may be a back-projection image including a stereoscopic image of the object 170 or a back-projection image including a monoscopic image of the object 170.

The processor 300 may operate (or call) the operation mode of the image processing apparatus 100 as a first operation mode or a second operation mode based on information that the sensor 150 senses the user. The first operation mode may mean a stereoscopic viewing mode, and the second operation mode may mean a monoscopic touching mode.

In the stereoscopic viewing mode, the user may view the object 170 stereoscopically through the transparent flat plate 130. In the monoscopic touching mode, the user may view the back-projection image including the monoscopic image obtained by back-projecting the object 170 onto the transparent flat plate 130. In the monoscopic touching mode, the user may control the object 170 using the monoscopic image displayed on the transparent flat plate 130.

The processor 300 may provide a method of interacting with the object 170 in the AR, the VR, the MR, or the XR in a method such as by touching the transparent flat plate 30 by the user and the like by displaying the back-projection image obtained by back-projecting the object 170 that is far away from the transparent flat plate 130 (e.g., distant) on the transparent flat plate 130.

The processor 300 may process data stored in the memory 200. The processor 300 may execute computer-readable codes (e.g., software) stored in the memory 200 and instructions induced by the processor 300.

The processor 300 may be a data processing device implemented as hardware having a circuit having a physical structure for executing desired operations. For example, desired operations may include code or instructions included in a program.

For example, the data processing device implemented as hardware includes a microprocessor, a central processing unit, a processor core, a multi-core processor, and a multi-processor, an application-specific integrated circuit (ASIC), and a field programmable gate array (FPGA).

The transparent flat plate 130 may have a transparent flat plate shape. The transparent flat plate 130 may communicate with the image processing apparatus 100.

The sensor 150 may sense the user. For example, the sensor 150 may sense the distance between the user's hand and the transparent flat plate 130. The sensor 150 may transmit information that the sensor 150 senses the user, for example, information on a distance between the user's hand and the transparent flat plate 130 to the processor 300 of the image processing apparatus 150.

The sensor 150 may be implemented in the image processing apparatus 150 or the transparent flat plate 130. In addition, the sensor 150 may be separately implemented outside the image processing apparatus 100 or the transparent flat plate 130.

As described above, so that the user may better interact with the object 170 and the vicinity of the object 170, the image processing apparatus 100 may provide a method that the user may directly touch at least one of the distant object 170 and the vicinity area of the object using the transparent flat plate 130.

The image processing apparatus 100 provides the user with the UI that can directly touched the distant object 170 without binocular disparity in immersive reality (AR or VR) based on the HMD which is similar to smartphone-based mobile reality (AR or VR).

FIG. 3A to FIG. 3D are diagrams for schematically illustrating a concept of an operation in which the image processing apparatus processes an image using a transparent flat plate.

Each figure illustrate processes of the operation that the user interacts with the object 170 using the image processing apparatus 100 in an immersive world (e.g., AR, VR, MR, XR or the like) implemented by the image processing apparatus 100.

Figure 3A:
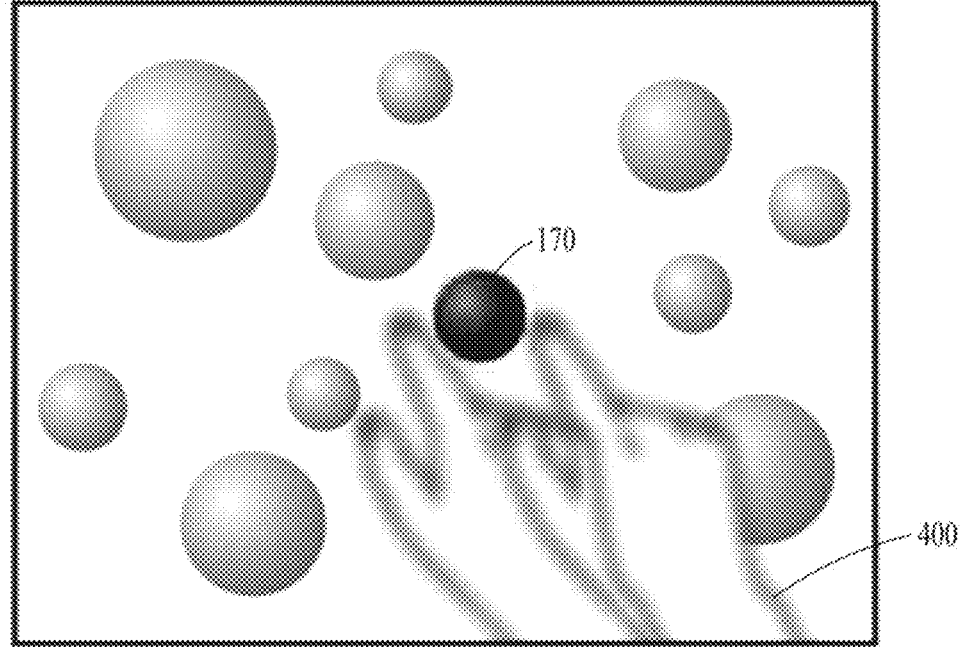
FIG. 3A to FIG. 3D are diagrams for schematically illustrating a concept of an operation in which the image processing apparatus processes an image using the transparent flat plate.

FIG. 3A illustrates a situation in which the user attempts to interact with the distant object 170 without the transparent flat plate 130. In this case, the user may experience difficulties in direct interaction with the object 170 due to the absence of haptic feedback and the occurrence of binocular disparity. For example, when the user attempts to select the object 170 with the hand 400, the user's hand 400 is nor able to accurately point to the object 170 due to binocular disparity.

Figure 3B:
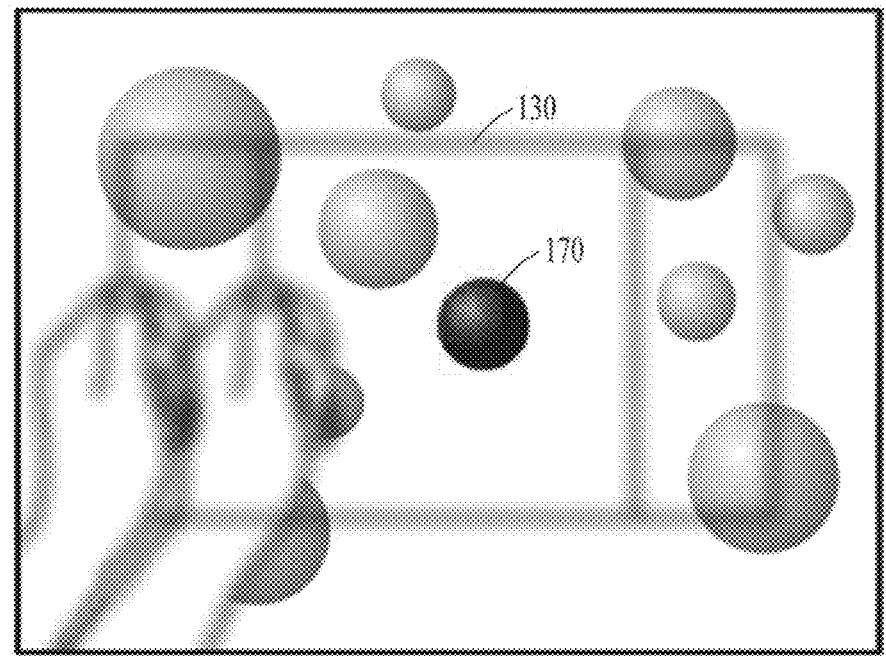

FIG. 3B is a diagram illustrating a situation in which a user views the object 170 through the transparent flat plate 130. The user may stereoscopically view the object 170 through the transparent flat plate 130. In this case, the transparent flat plate 130 that is relatively closer than the distant object 170 may appear out of focus to the user due to binocular disparity.

Figure 3C:
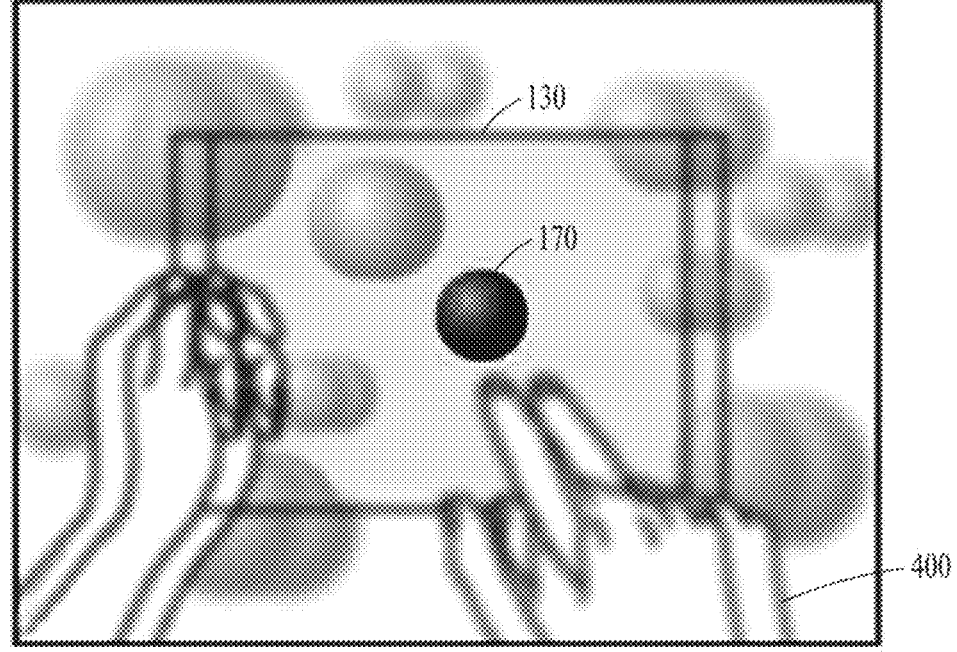

FIG. 3C is a diagram illustrating an operation in which the user brings the user's hand 400 close to the transparent flat plate 130 in order to interact with the object 170. When the user's dominant hand 400 approaches the transparent flat plate 130, the image processing apparatus 100 may display the back-projection image obtained by back-projecting the object 170 onto the transparent flat plate 130 on the transparent flat plate 130. The image processing apparatus 100 may perform animated flattening when the dominant hand 400 approaches the transparent flat plate 130. In other words, the image processing apparatus 100 may display the object 170 on the transparent flat plate 130 while gradually flattening the object 170 as the dominant hand 400 approaches the transparent flat plate 130.

Figure 3D:
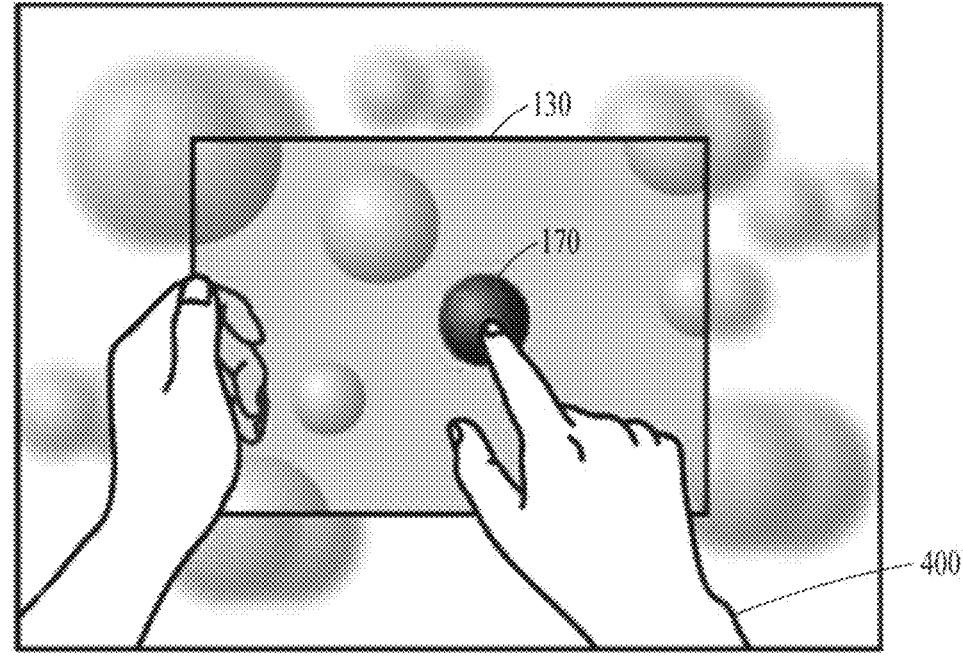

FIG. 3D is a diagram illustrating a situation in which the user interacts with the object 170 using the transparent flat plate 130. When the user's dominant hand 400 is close to the transparent flat plate 130 by a predetermined distance or less, the image processing apparatus 100 may display the monoscopic image obtained by back-projecting the object 170 onto the transparent flat plate 130 on the transparent flat plate 130. For example, when the user's dominant hand 400 touches the transparent flat plate, the image processing apparatus 100 may display the monoscopic image obtained by back-projecting the object 170 onto the transparent flat plate 130 on the transparent flat plate 130. In this case, the user may have the haptic feedback and interact with the object 170 without binocular disparity.

Figure 4A:
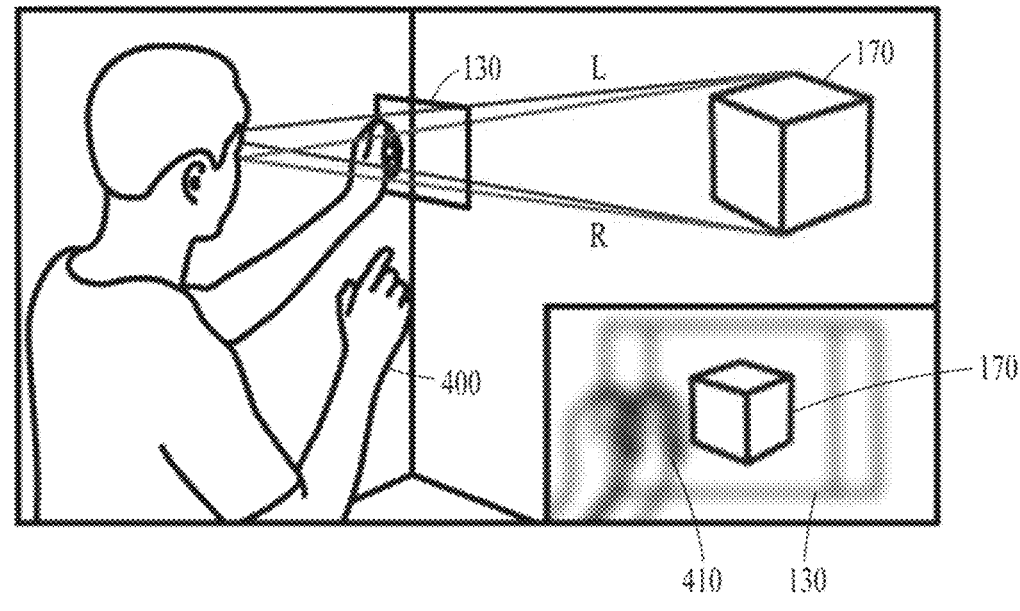
FIG. 4A is a diagram illustrating an operation of the image processing apparatus in a first operation mode of the image processing apparatus.

FIG. 4A is a diagram illustrating an operation of the image processing apparatus in the first operation mode of the image processing apparatus.

The image processing apparatus 100 may operate in the stereoscopic viewing mode, which is the first operation mode. When the user simply holds the transparent flat plate 130 with a non-dominant hand, the image processing apparatus 100 may operate in the stereoscopic viewing mode.

The user may view the object 170 stereoscopically through the transparent flat plate 130 in the stereoscopic viewing mode. In other words, in the stereoscopic viewing mode, the object 170 viewed by the user through the transparent flat plate 130 and the object 170 viewed without the transparent flat plate 130 are the same.

Accordingly, the user may lift the transparent flat plate 130 up to the level of the eyes without taking their eyes off the object 170 while gazing at the distant object 170 with both eyes.

Figure 4B:
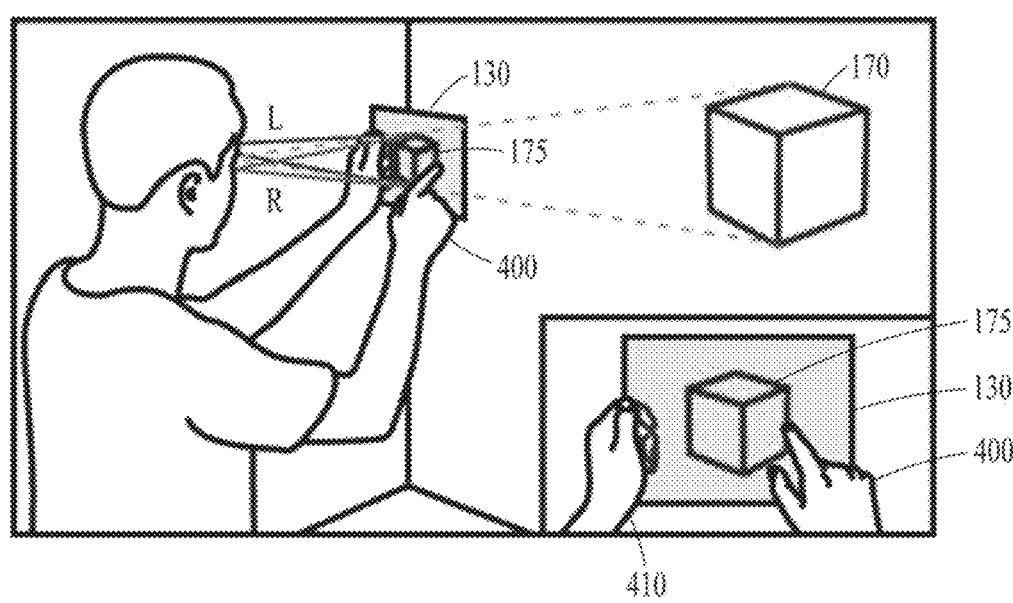
FIG. 4B is a diagram illustrating an operation of the image processing apparatus in a second operation mode of the image processing apparatus.

FIG. 4B is a diagram illustrating an operation of the image processing apparatus in the second operation mode of the image processing apparatus.

The image processing apparatus 100 may operate in the monoscopic touching mode, which is the second operation mode. When the user brings the dominant hand 400 close to the transparent flat plate 130 and the distance between the dominant hand 400 and the transparent flat plate 130 is less than or equal to a threshold (e.g., 2 cm), the image processing apparatus 100 may operate in the monoscopic touching mode.

In the monoscopic touching mode, the image processing apparatus 100 may display a monoscopic image 175 obtained by back-projecting the object 170 onto the transparent flat plate 130 on the transparent flat plate 130. The monoscopic image 175 is an image obtained by back-projecting the object 170 onto the transparent flat plate 130 based on a central point between the user's two eyes.

In other words, in the monoscopic touching mode, the transparent flat plate 130 operates as an opaque plate simulating as if transparent to the user by displaying monoscopic image 175 with the corrected viewpoint. In this case, the user may interact with the object 170 without the effect of binocular disparity by using the monoscopic image 175 displayed on the transparent flat plate 130. For example, the user may interact with the object 170 by touching, swiping, or pinching the surface of the transparent flat plate 130.

Figure 5:
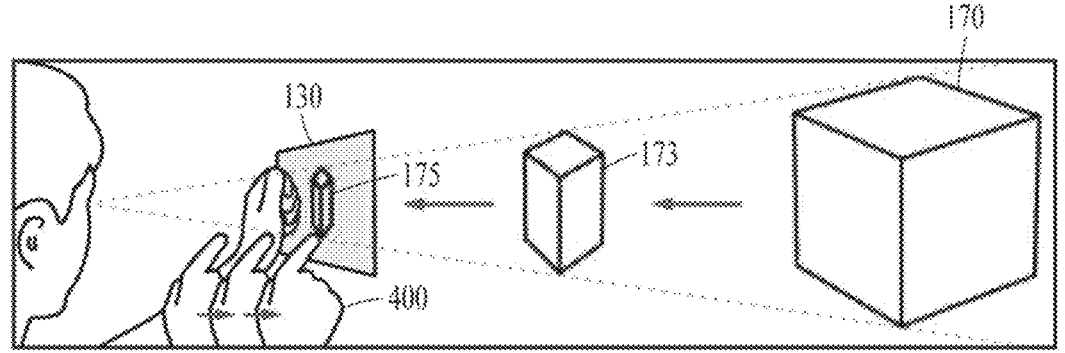
FIG. 5 is a diagram illustrating an image processing operation when an operation mode of the image processing apparatus is switched.

FIG. 5 is a diagram illustrating the image processing operation when an operation mode of the image processing apparatus is switched.

As the user's dominant hand 400 approaches the transparent flat plate 130, the image processing apparatus 100 may gradually flatten the object 170 to be back-projected onto the transparent flat plate 130. In this way, the image processing apparatus 100 may perform the animated flattening image processing operation for smooth mode switching.

In the stereoscopic viewing mode, the object 170 may maintain the object's original volume, and the user may view the object 170 three-dimensionally. In the monoscopic touching mode, the object 170 is back-projected onto the transparent flat plate 130 to be flatly displayed on the transparent flat plate 130. In other words, the object 170 of the monoscopic image 175 displayed on the transparent flat plate 130 in the monoscopic touching mode is displayed flat. Therefore, even when the viewpoints are aligned, when the image processing apparatus 100 switches from the stereoscopic viewing mode to the monoscopic touching mode, visual confusion may occur due to a sudden change and eye fatigue may be induced. The animated flattening image processing operation of the image processing apparatus 100 may compensate for this side effect.

The image processing apparatus 100 may display a back-projection image 173 in which the flatness of the object 170 is gradually increased as the user's dominant hand 400 approaches the transparent flat plate 130 on the transparent flat plate 130. The image processing apparatus 100 may map the flatness of the object 170 to the distance between the user's dominant hand 400 and the transparent flat plate 130, display the back-projection image 173 in which the object 170 is flatter on the transparent flat plate 130 when the dominant hand 400 approaches the transparent flat plate 130, and when the dominant hand 400 moves away from the transparent flat plate 130, display the back-projection image 173 in which the object 170 becomes less flat on the transparent flat plate 130.

The image processing apparatus 100 may display the back-projection image obtained by back-projecting the object 170 moving in the direction of the transparent flat plate 130 along a straight line connecting the vertices of the object 130 and the central point between the user's eyes on the transparent flat plate 130 while the object 170 maintains the apparent size and, or display the back-projection image of the object 170 back-projected back to the object's original position on the transparent flat plate 130. When the object 170 is moved at a linear ratio as shown in Equation 1 below, since the object is displayed as if the object moves at different non-linear ratios from the viewpoints of the user's left and right eyes, the switching process may look unstable and distorted. Accordingly, the image processing apparatus 100 moves the object 170 at a non-linear ratio as shown in Equation 2 to linearly move the object 170 in the back-projection image 173 viewed by the user.

$$v(\mathcal{F}) = f_{in-space}(\mathcal{F}) = v_0 + \mathcal{F} \times (v_1 - v_0) \qquad \text{[Equation 1]}$$

$$v(\mathcal{F}) = \qquad\qquad\qquad\qquad\qquad\qquad\qquad \text{[Equation 2]}$$
$$f_{on-screen}(\mathcal{F}) = v_0 + \frac{(1+k)\mathcal{F}}{1+k\mathcal{F}}(v_1 - v_0) \text{ where } k = \frac{(v_0 - p)\cdot n_p}{(p - m)\cdot n_p}$$

In Equation 1 and Equation 2, F is a value between 0 and 1 with a flatness proportional to the distance between the user's dominant hand 400 and the transparent flat plate 130, v is the position of the vertex during switching, and $v_0$ is the original position of the vertex, $v_1$ is the position of the completely flattened vertex, p is the central position of the transparent flat plate 130, m is the position of the central point between the user's eyes, and $n_p$ is the normal vector of the transparent flat plate 130.

Figure 6A:
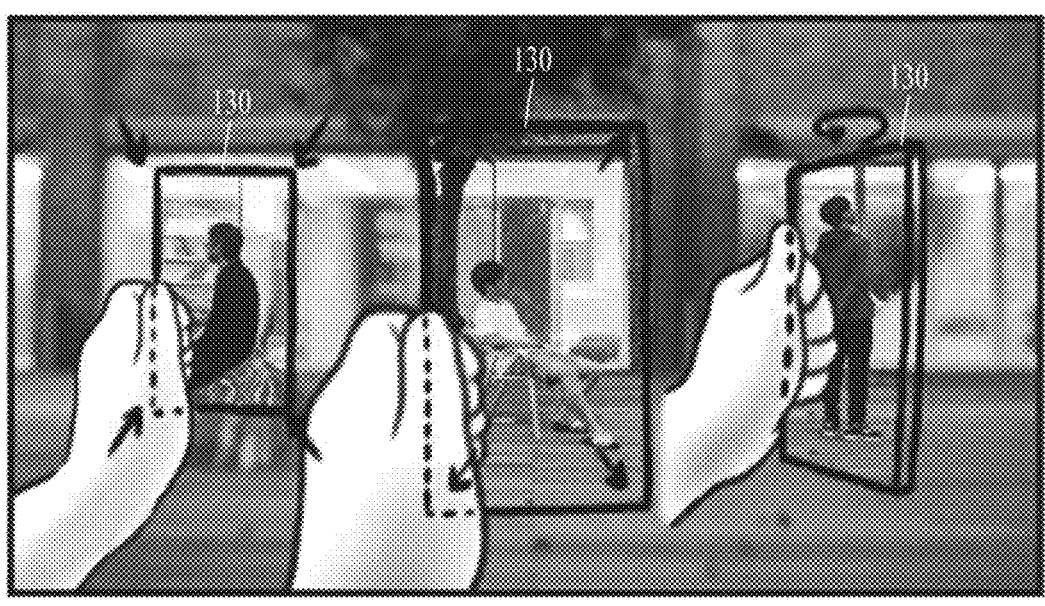
FIG. 6A and FIG. 6B are diagrams illustrating an example of an application to which a method of processing an image using a transparent flat plate is capable of being applied according to an example embodiment.
Figure 6B:
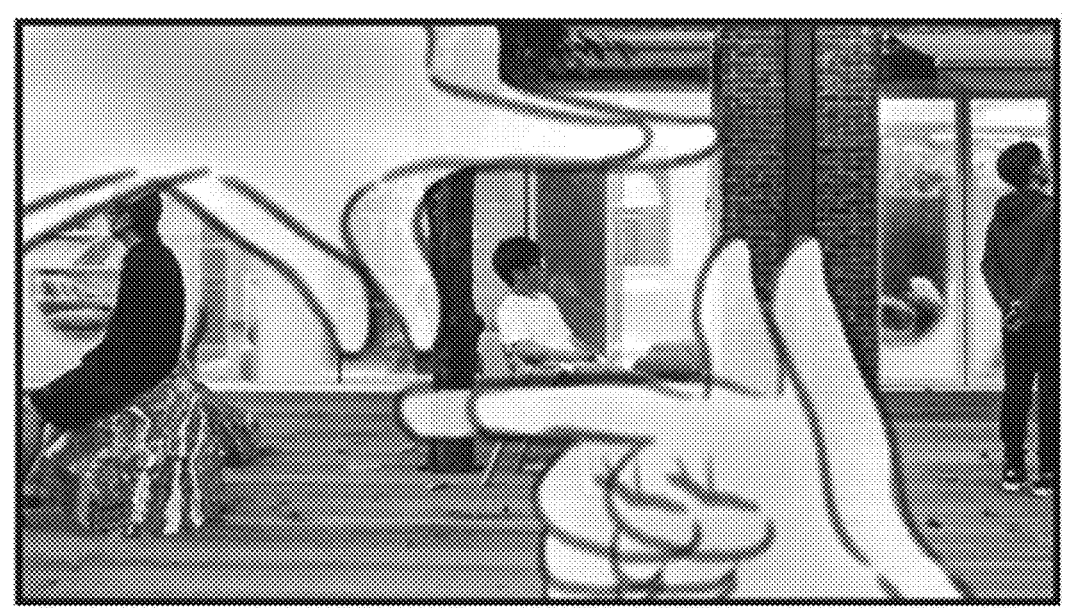

FIG. 6A and FIG. 6B are diagrams illustrating an example of an application to which a method of processing an image using a transparent flat plate is capable of being applied according to an example embodiment.

FIG. 6A and FIG. 6B illustrate a case where a method of processing an image using the transparent flat plate is applied to an AR camera application.

Referring to FIG. 6A, the image processing apparatus 100 may be used for the AR camera. The user may position the transparent flat plate 130 so that an area to be captured is visible through the transparent flat plate 130, and the image processing apparatus 100 may back-object the area that the user views through the transparent flat plate 130 to display the back-projected monoscopic image on the transparent flat plate 130. The user may capture the monoscopic image displayed on the transparent flat plate 130 and use the monoscopic image as the AR camera.

The user may move the transparent flat plate 130 closer to or further away from the eye to capture a larger area or a narrower area of the view frustum. For example, the user may move the transparent flat plate 130 closer to the eye to zoom-in, or move the transparent flat plate away from the eye to zoom-out.

Referring to FIG. 6B, when the image processing apparatus 100 is not used, it can be seen that the area to be captured may become unclear due to binocular disparity. The image processing apparatus 100 may clarify the definition of a frame by solving such an issue.

Figure 7A:
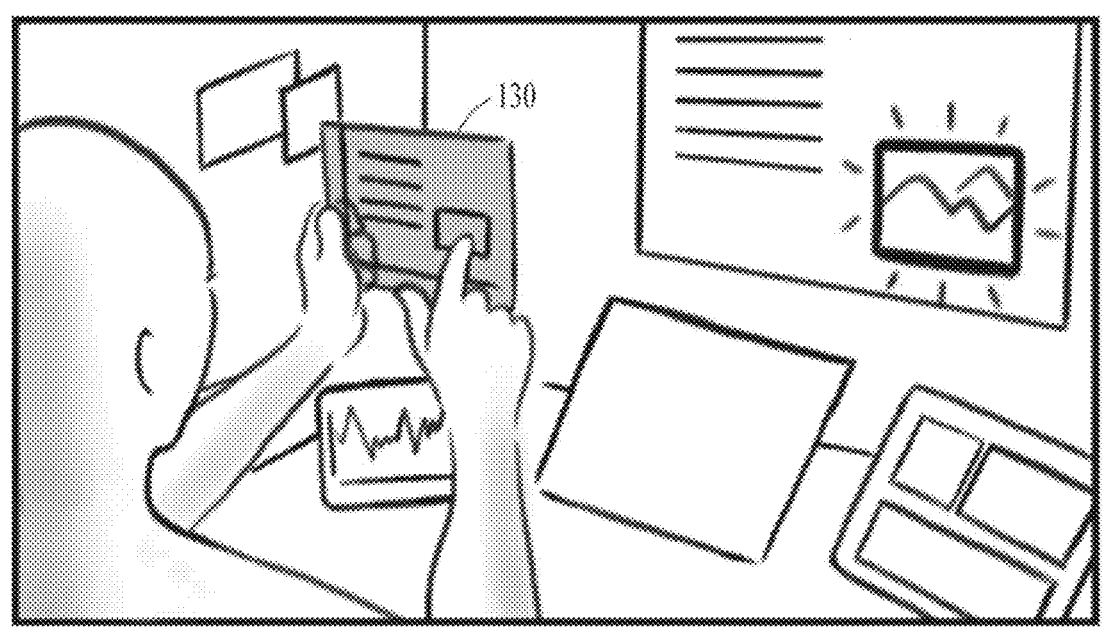
FIG. 7A and FIG. 7B are diagrams illustrating another example of an application to which a method of processing an image using a transparent flat plate is capable of being applied according to an example embodiment.
Figure 7B:
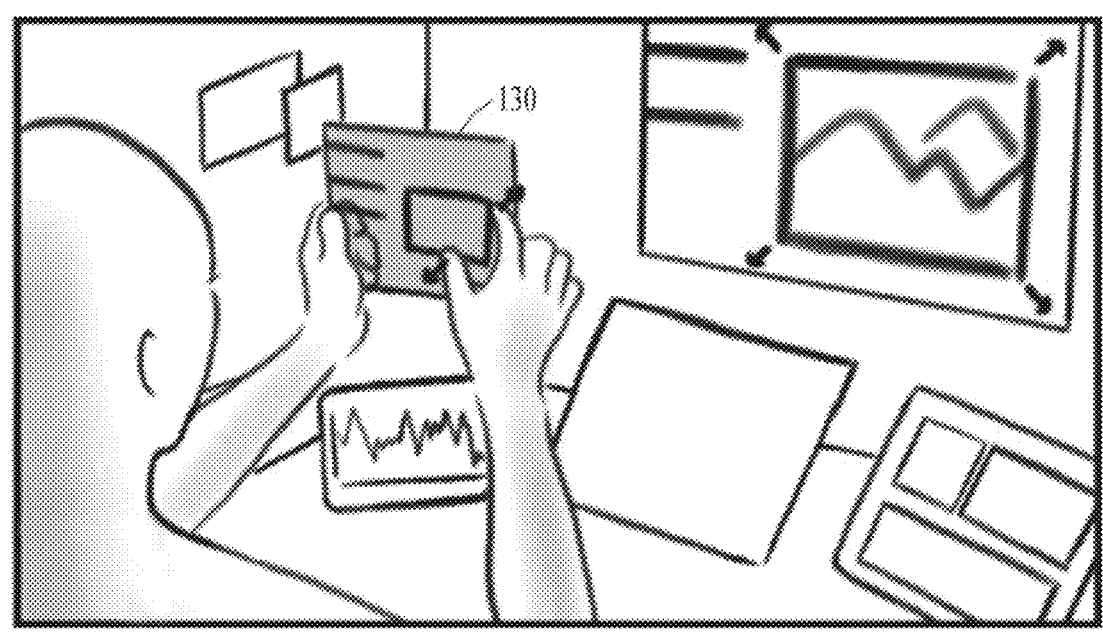

FIG. 7A and FIG. 7B are diagrams illustrating another example of an application to which a method of processing an image using a transparent flat plate is capable of being applied according to an example embodiment.

FIG. 7A and FIG. 7B, a case in which the image process-ing method using the transparent flat plate is applied to AR web browsing will be described.

The image processing apparatus 100 may be used for the AR web browsing. When the image processing apparatus 100 is used, it is possible to quickly and accurately select a small and distant UI element of the AR web browsing window. The user may interact with the UI element using a gesture such as touching the AR web browsing window displayed on the transparent flat plate 130. For example, the user may use the transparent flat plate 130 to control scrolling of the AR web browsing window or perform zoom-in or zoom-out.

Figure 8A:
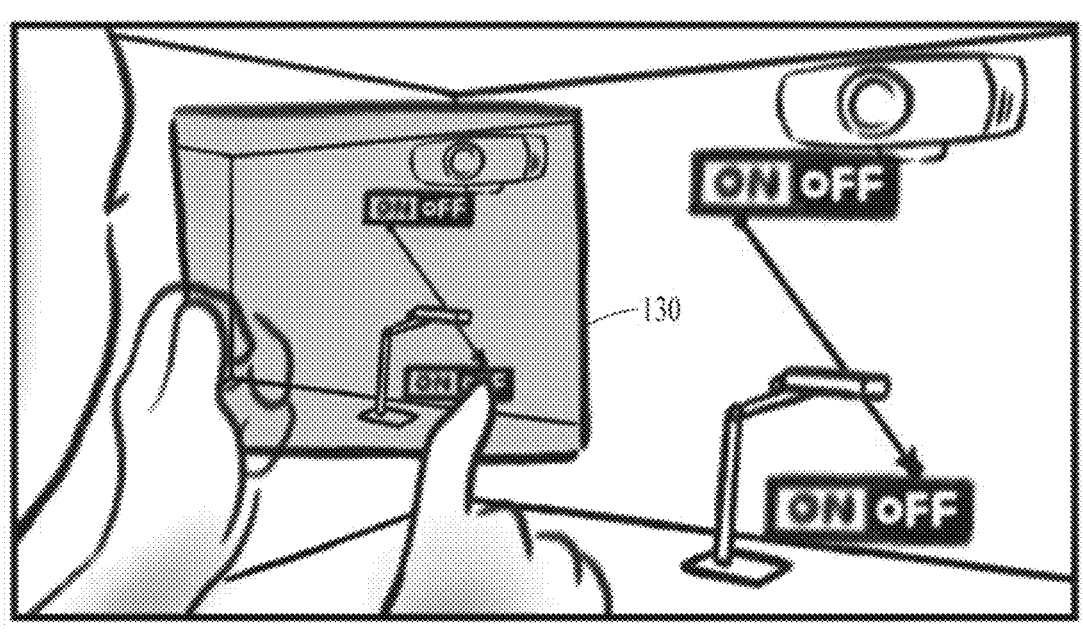
FIG. 8A and FIG. 8B are diagrams illustrating another example of an application to which a method of processing an image using a transparent flat plate is capable of being applied according to an example embodiment.
Figure 8B:
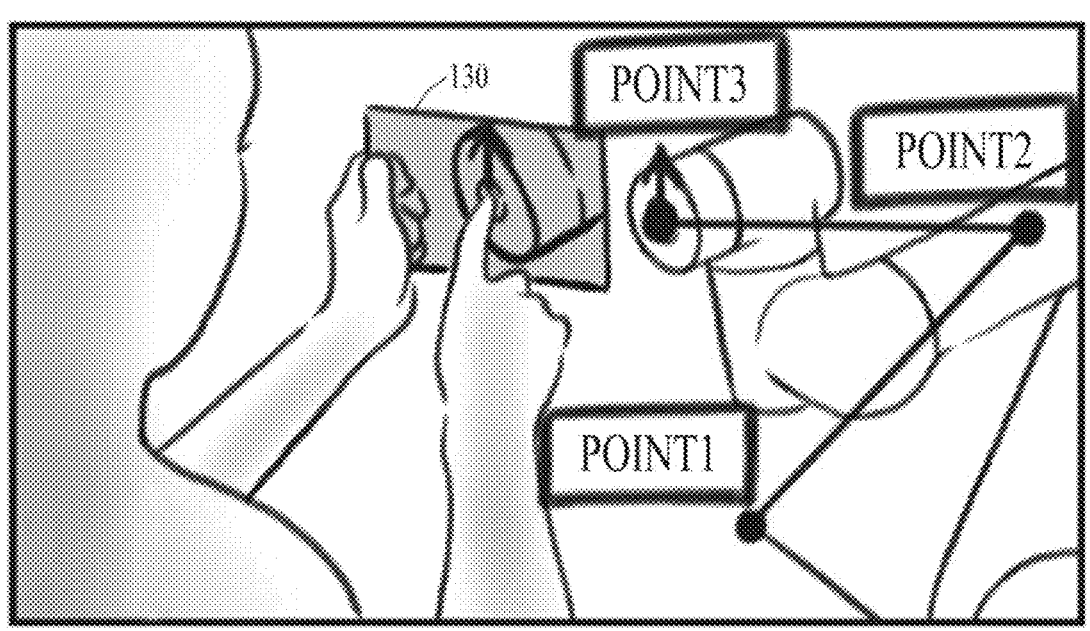

FIG. 8A and FIG. 8B are diagrams illustrating another example of an application to which a method of processing an image using a transparent flat plate is capable of being applied according to an example embodiment.

In FIG. 8A and FIG. 8B, a case in which the image processing method using the transparent flat plate is applied to an AR IoT application and a robot programming appli-cation will be described.

The image processing apparatus 100 may be used for AR IoT and robot programming. The user may define a func-tional relationship between objects by drawing a line between smart objects by using the image processing appa-ratus 100. For example, the user may set the functional relationship between objects by swiping between smart objects displayed on the transparent flat plate 130 by the image processing apparatus 100.

In addition, the user may control spatial operations of mobile robots and drones by using the image processing apparatus 100. For example, the user may move the mobile robot or drone displayed on the transparent flat plate 130 by the image processing apparatus 100 to a desired location by touching or swiping.

Figure 9A:
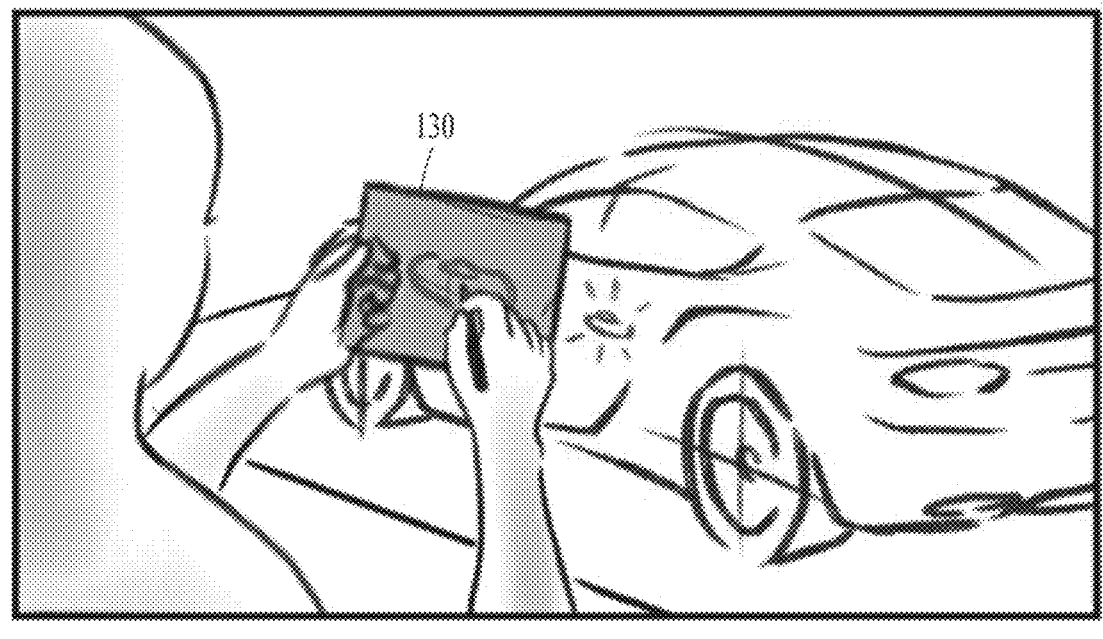
FIG. 9A and FIG. 9B are diagrams illustrating another example of an application to which a method of processing an image using a transparent flat plate is capable of being applied according to an example embodiment.
Figure 9B:
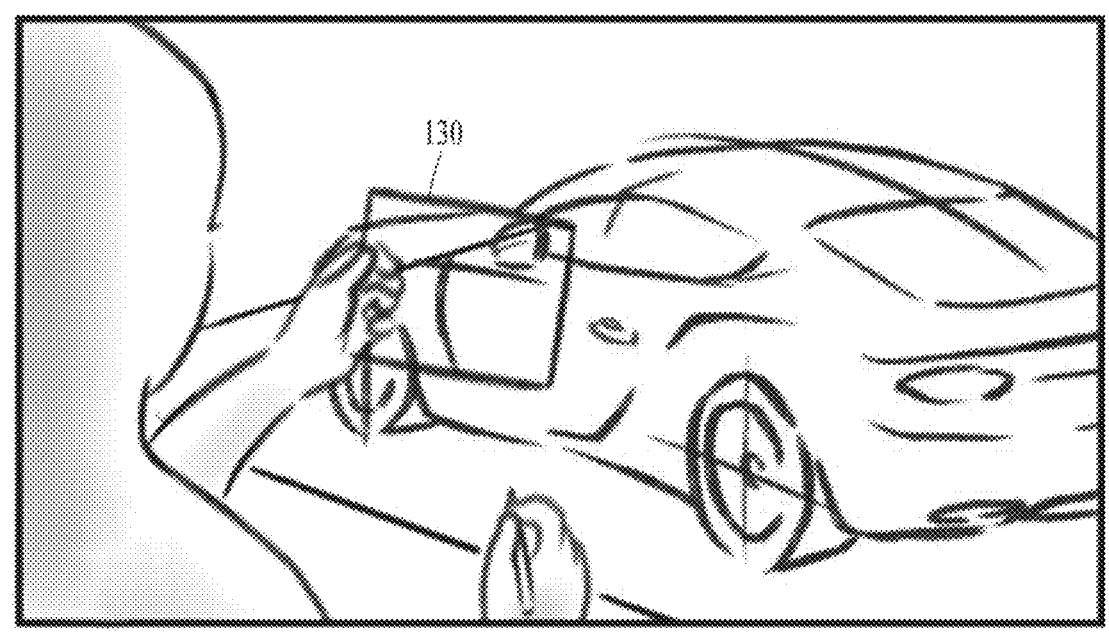

FIG. 9A and FIG. 9B are diagrams illustrating another example of an application to which a method of processing an image using a transparent flat plate is capable of being applied according to an example embodiment.

FIG. 9A and FIG. 9B illustrate a case in which the image processing method using the transparent flat plate is applied to an AR sketching application.

The image processing apparatus 100 may be used for AR 3D sketching. The user may perform sketching on the monoscopic image displayed on the transparent flat plate 130 by the image processing apparatus 100. The user may sketch on the transparent flat plate 130 in the monoscopic touching mode and check the 3D sketch in real time in the stereoscopic viewing mode.

The method according to an example embodiment may be recorded in the form of program instructions that may be executed through various computer means and recorded in a computer-readable medium. The computer-readable medium may include program instructions, data files, data structures, etc. alone or in combination. The program instructions recorded on the medium may be specially designed and configured for the embodiment, or may be known and available to those skilled in the art of computer software. Examples of the computer-readable recording medium include magnetic media such as hard disks, floppy disks and magnetic tapes, optical media such as CD-ROMs and DVDs, and magneto-optical media such as floptical disks, and hardware devices specially configured to store and execute program instructions, such as ROM, RAM, flash memory, and the like. Examples of program instruc-tions include not only machine language codes such as those generated by a compiler, but also high-level language codes that may be executed by a computer using an interpreter or the like. The hardware devices described above may be configured to operate as one or more software modules to perform the operations of the embodiments, and vice versa.

Software may include a computer program, code, instruc-tion, or a combination of one or more thereof, and may configure the processing device to operate as desired or may instruct the processing device independently or collectively. The software and/or data, to be interpreted by the processing device or to provide instructions or data to the processing device, may be permanently or temporarily embodied in any kind of machine, component, physical device, virtual equip-ment, computer storage medium, device, or a transmitted signal wave. The software may be distributed over net-worked computer systems and stored or executed in a distributed manner Software and data may be stored in one or more computer-readable recording media.

As described above, although the embodiments have been described with reference to the limited drawings, those skilled in the art may apply various technical modifications and variations based on the above. For example, even if the described techniques are performed in an order different from the described method, and/or the components of the described system, structure, device, circuit, and etc. are combined or combined in a form different from the described method, or replaced or substituted by other com-ponents or equivalents, appropriate results may be achieved.

Therefore, other implementations, other example embodi-ments, and equivalents to the claims are also within the scope of the following claims.

The invention claimed is:

1. An image processing method comprising:
obtaining information on sensing a relationship between a user's hand and a transparent flat plate;
switching to a first operation mode or a second operation mode using the transparent flat panel based on the information;
providing at least one object visible through the transpar-ent flat panel in the switched operation mode using the transparent flat panel; and
wherein the first operation mode is a stereoscopic viewing mode that three-dimensionally provides the at least one object through the transparent flat panel,
and the second operation mode is a monoscopic touching mode in which an image obtained by back-projecting the at least one object onto the transparent flat panel is displayed on the transparent flat panel.

2. The method of claim 1, wherein the providing com-prises displaying the image comprising a stereoscopic image of the at least one object in the first operation mode.

3. The method of claim 1, wherein the providing com-prises displaying the image comprising a monoscopic image of the at least one object in the second operation mode.

4. The method of claim 1, wherein the image is an image obtained by back-projecting the at least one object while maintaining an apparent size of the at least one object.

5. The method of claim 1, wherein the information on sensing comprises a distance between the user's hand and the transparent flat plate and whether the user's hand holds the transparent flat plate.

6. The method of claim 5, wherein the providing com-prises providing the image for gradually flattening the at least one object as the distance decreases during switching from the first operation mode to the second operation mode.

7. The method of claim 5, wherein the providing com-prises providing the image for gradually unflattening the at least one object as the distance increases during switching from the first operation mode to the second operation mode.

8. The method of claim 5, wherein the providing comprises displaying the image comprising a monoscopic image of the at least one object on the transparent flat plate when the distance is less than or equal to a threshold.

9. The method of claim 1, further comprising:
controlling at least one of the at least one object and a vicinity of the at least one object using the image.

10. A computer program stored in a non-transitory computer-readable recording medium in combination with hardware to execute the method of claim 1.

11. An image processing apparatus comprising:
a memory comprising instructions; and
a processor configured to execute the instructions,
wherein, when the instructions are executed by the processor, the processor is configured to:
switch to a first operation mode or a second operation mode using the transparent flat panel based on information sensed on a relationship between a user's hand and a transparent flat plate, and
provide at least one object visible through the transparent flat panel in the switched operation mode, wherein
the first operation mode is a stereoscopic viewing mode that three-dimensionally provides the at least one object through the transparent flat panel, and the second operation mode is a monoscopic touching mode in which an image obtained by back-projecting the at least one object onto the transparent flat panel is displayed on the transparent flat panel.

12. The image processing apparatus of claim 11, wherein the processor is configured to display the image comprising a stereoscopic image of the at least one object in the first operation mode.

13. The image processing apparatus of claim 11, wherein the processor is configured to display the image comprising a monoscopic image of the at least one object in the second operation mode.

14. The image processing apparatus of claim 11, wherein the image is an image obtained by back-projecting the at least one object while maintaining an apparent size of the at least one object.

15. The image processing apparatus of claim 11, wherein the information on sensing comprises a distance between the user's hand and the transparent flat plate and whether the user's hand holds the transparent flat plate.

16. The image processing apparatus of claim 15, wherein the processor is configured to display provide the image for gradually flattening the at least one object as the distance decreases during switching from the first operation mode to the second operation mode.

17. The image processing apparatus of claim 15, wherein the processor is configured to provide the image for gradually unflattening the at least one object as the distance increases during switching from the first operation mode to the second operation mode.

18. The image processing apparatus of claim 15, wherein the processor is configured to display the image comprising a monoscopic image of the at least one object on the transparent flat plate when the distance is less than or equal to a threshold.

19. The image processing apparatus of claim 11, wherein the processor is configured to control at least one of the at least one object and a vicinity of the at least one object by using the image.

20. The image processing apparatus of claim 11, wherein a sensor configured to sense the user is located in at least one of the transparent flat plate and the image processing apparatus.

* * * * *